United States Patent
Dodd

[15] 3,651,553
[45] Mar. 28, 1972

[54] BEARING RACE DRIVER

[72] Inventor: Russell O. Dodd, 1010 North Vernon Pl., Azusa, Calif. 91702

[22] Filed: Oct. 8, 1970

[21] Appl. No.: 79,047

[52] U.S. Cl. ................................................29/201, 29/275
[51] Int. Cl. ....................................B23p 19/04, B25b 27/14
[58] Field of Search ....................................29/201, 200, 275

[56] References Cited

UNITED STATES PATENTS

| | | | |
|---|---|---|---|
| 2,441,981 | 5/1948 | Stelzer | 29/275 |
| 2,852,838 | 9/1958 | Krutmeijer | 29/201 |
| 3,209,445 | 10/1965 | Moskovitz | 29/275 |

*Primary Examiner*—Thomas H. Eager
*Attorney*—Wm. Jacquet Gribble

[57] ABSTRACT

A driving tool having a drive handle with a reduced diameter boss to which any one of a plurality of drive collars is attachable. Each collar has a central bore which makes a snug fit with the driver boss and a shoulder adapted to contact the outer face of a friction bearing race. The shoulder abuts a frustoconical exterior wall adapted to fit within the tapered race. The shoulder has an outer diameter slightly less than the outer diameter of the race. A threaded bore in the boss end of the driver affords means for attaching a suspension attachment for suspending the drive collar and race within a housing bore until the race is properly positioned to be driven.

10 Claims, 4 Drawing Figures

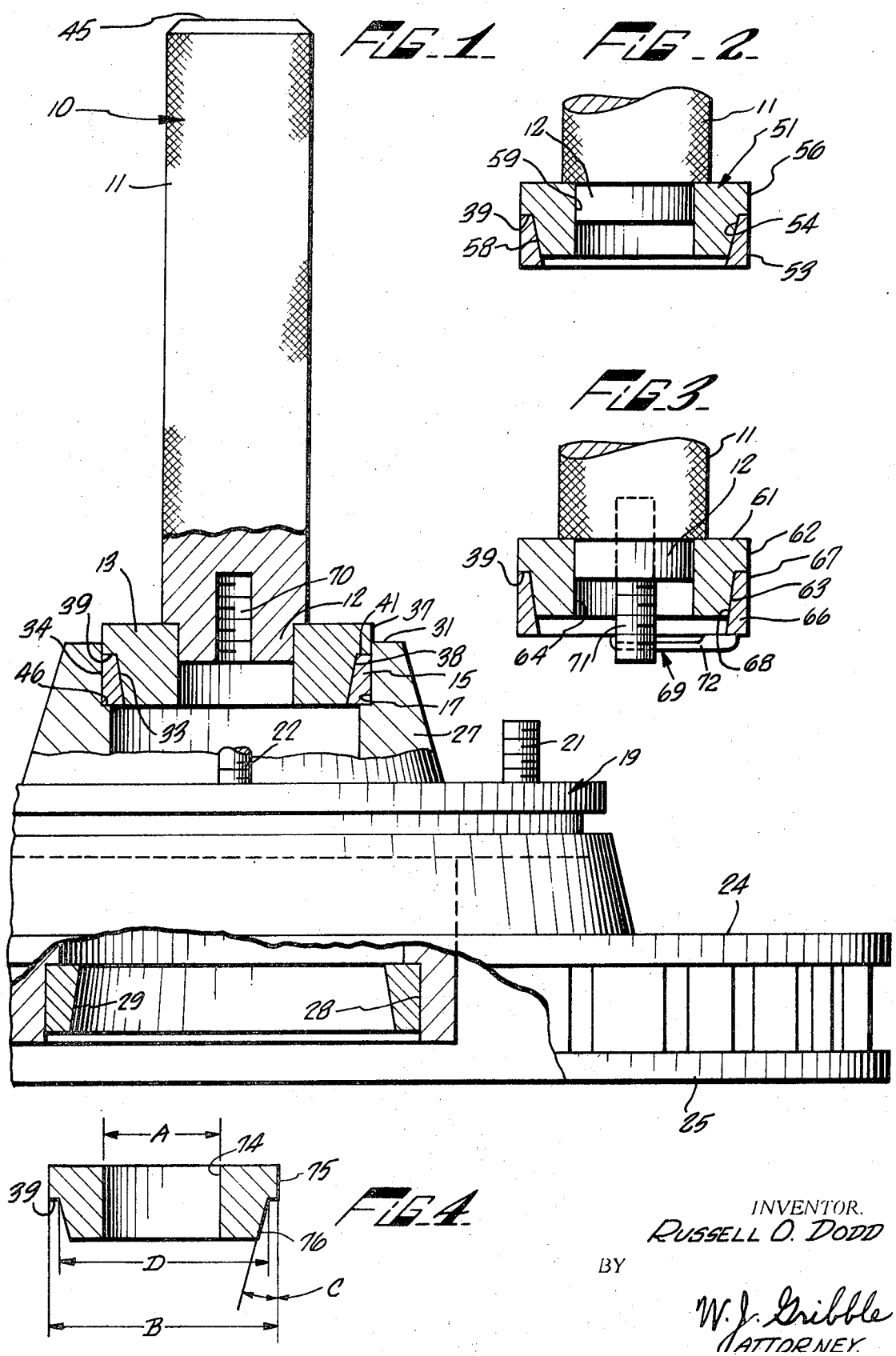

3,651,553

BEARING RACE DRIVER

BACKGROUND OF THE INVENTION

The alignment of the friction bearing race, within the hub of an automobile wheel, for instance, is critical. The relationship of the wheel to the axle is determined by the attitude of the front and rear bearings centrally located in the wheel. The alignment is particularly critical in present day disc brakes because of the large displacement of the brake caliper pads from the center line of the axle about which the friction bearings fit. If not properly aligned, the bearings cause a disc wobble with respect to the calipers which not only interferes with proper braking action but quickly deteriorates the braking surface and the caliper pads. Misalignment can also affect the efficiency of drum brakes, but not to the extent that the caliper disc brake is affected.

Previous attempts to achieve a bearing driving tool are exemplified by the U.S. Pat. to E.E. Stelzer No. 2,441,981 issued May 25, 1948. Most such attempts have not succeeded commercially because of their complications or their inability to adapt to the many types of bearings presently in use.

The present invention, by employing only six drive collars, encompasses the wheel bearing requirements of all United States automobiles from 1963 to 1971. The nominal outer diameter of the bearing race can vary from 1 9/16 to 2 9/16 inches. Obviously a single driver collar cannot efficiently encompass this range of sizes. The internal race taper also may vary between 10° and 14° and the taper difference is sufficient to interfere with proper alignment should a single drive collar with a fixed taper be utilized. The invention, therefore, directs to providing a driver with a plurality of drive collars adapted to suit the range of bearings used in the majority of automobiles.

SUMMARY OF THE INVENTION

The invention contemplates an elongate driver handle having a reduced diameter boss at one end and a threaded hole central of the boss end. The boss receives one of a plurality of drive collars, each of which has an outer flange adjacent a frustoconical aligning wall, both flange and wall being concentric with a central collar aperture adapted to fit the driver boss. Each drive collar differs from another either in the angle and major and minor diameters of the frustoconical wall or in the diameter of the outer flange. Preferably the threaded hole is adapted to secure to the driver handle a retainer attachment for retaining a drive collar and a roller bearing race to the handle when the race is being lowered into a bearing cavity of some depth.

The described apparatus of the invention achieves the objectives of a dependable bearing race driver by means of which the outer race of wheel roller bearings may be accurately positioned within a wheel hub such that the brake disc or drum is accurately aligned with respect to the axis of rotation of the wheel.

These and other advantages of the invention are apparent in the following detailed description and drawing.

BRIEF DESCRIPTION OF THE DRAWING

FIG. 1 is an elevational view, partly in section, of the roller bearing race driver of the invention in use on a wheel;

FIG. 2 is a fragmentary elevation, partly in section, showing the race driver of the invention associated with a bearing race;

FIG. 3 is a fragmentary elevation, partly in section, showing the bearing race driver with a race retainer attachment; and FIG. 4 is a schematic representation of a drive collar of the invention.

DESCRIPTION OF THE PREFERRED EMBODIMENT

In FIG. 1 a roller bearing race driver 10 having an elongate knurled handle 11 with a reduced diameter boss 12 is combined with one of a plurality of drive collars 13. The collar is engaged with a roller bearing race 15 adapted to seat in the cylindrical bore 17 of an automobile wheel 19 of the disc brake type.

The illustrative wheel represents schematically the wheel of a 1966 Thunderbird automobile and has wheel lugs like lugs 21, 22 to which the wheel rim and tire are secured, and oppositely oriented brake discs 24, 25 against which caliper brake pads (not shown) bear in conventional disc brake fashion when the brakes are applied.

A wheel hub 27 has the exterior bearing recess 17 in which the bearing race 15 is lodged and an interior bearing recess 28 in which a bearing race 29 has previously been seated.

In either application of the race driver to the wheel, better practice dictates that the wheel be laid flat upon either the front face 31 of the exterior hub portion or upon the disc 25 for accurate alignment purposes. In utilizing the inventive apparatus, it is first necessary to select the drive collar which is suited to the particular bearing race to be driven into its recess in the wheel hub. The taper of the interior race wall 33 and the diameter of the exterior race wall 34 must both be considered, along with the major and minor diameters of the interior wall 33. Once a proper drive collar has been selected, the collar is slipped onto driver boss 12 with the drive collar flange 37 adjacent the elongate handle portion 11. A tapered or frustoconical exterior wall 38 of the drive collar has a major diameter less than the collar flange diameter such that a drive shoulder 39 is defined where the frustoconical wall abuts the flange. The shoulder rests upon the outer face 41 of the bearing race to be seated in the recess 17.

If the tapers of the bearing interior wall 33 and the collar exterior wall 38 are closely matched, shoulder 39 seats evenly around the face 41 of the race. With the shoulder carefully registered against the race, the elongate handle 11 is a visual vertical indicator of the relationship between the brake discs 24, 25 and the axis of rotation of the wheel. By tapping upon the outer end 45 of the handle when the proper alignment is determined by visual inspection, the race can be driven into properly aligned position in the hub recess, whether or not the seat shoulder 46 of the hub recess is properly or uniformly aligned with respect to the wheel axis of rotation.

The importance of alignment can be appreciated from an inspection of FIG. 1, where the outer radial displacement of the brake disc periphery is seen to be approximately 6 inches from the axis of rotation. It can thus be seen that any misalignment of the bearing race adjacent the axis of rotation is magnified by the lever arm representing the distance to the outer periphery of the brake discs.

A similar misalignment occurs in those wheels using drum type brakes, although the effect of the misalignment is not as pronounced with respect to the operation of the drum brakes as it is with respect to the disc brakes. However, in the instance of either type of brakes, misalignment of the wheel bearing races seriously affects the wear on the wheel tires, which are even further displaced from the axis of rotation such that a wobble effect is imposed upon the tire contact surface.

Two of the more common bearing races are shown in FIGS. 2 and 3 associated with the particular drive collar adapted to properly insert them into their respective hub recesses. In FIG. 2, handle 11 with its driver boss 12 is associated with a drive collar 51 about which a roller bearing race 53 is positioned. Race 53 is a race having a thickness of approximately thirteen thirty-secondths inch and an outside diameter of 1.976 inches and an interior bore 54 which tapers 13° from a major diameter of 1.811 inches. The complementary drive collar has a flange 56 with a diameter of 1.971 inches and a frustoconical exterior wall 58 with a 13° taper from a major diameter of 1.806 inches. Like the rest of the drive collars, the collar 51 has an internal bore 59 having a diameter of 1.000 inch. The diameter of boss 12 is only slightly less than the internal diameter of bore 59 to make for a snug slip fit between the collars and the boss.

The thickness of the flange is one-fourth inch to the contact shoulder 39, an arbitrary figure, and the total thickness of the collar is approximately five-eighth inch.

In FIG. 3 the handle 11 of the race driver and its boss 12 are associated with a drive collar 61 which has a flange 62, a frustoconical exterior wall 63 and a drive shoulder 39. As in the previously described collar, the internal bore of the collar 64 has a diameter of 1.000 inch. The total depth or thickness of the collar is five-eighths inch. Its outer diameter is 1.964 inches.

The bearing race 66 has a cylindrical outer wall 67 and a tapering inner wall 68 with which the frustoconical wall 63 of the collar is engaged. The dimensions of the bearing race are an outer diameter of 1.970 inches, a taper of 10° from a major diameter of 1.745 inches.

The bearing of FIG. 3 may be a New Departure model M12610.

A retainer attachment 69 is shown engaged with a threaded aperture 70 of the bearing race driver. The retainer 69 has a threaded shank 71 and a slip pin 72 which contacts the race or the drive collar to retain either of those members during passage of the members into seating position in deep recesses. Rotation of the handle releases the retainer from the threaded aperture, allowing it to be removed from the bearing race.

In FIG. 4 the drive collar of the invention is schematically represented in section. The diameter of an inner bore 74 is represented by the dimension A. The dimension B represents the outer diameter of a flange wall 75. The dimension C indicates the angle of taper of a frustoconical exterior wall 76 and the dimension D indicates the major diameter of the frustoconical wall at its juncture with shoulder 39 of the flange.

The dimension A is always the same, 1.000 inch, in order to provide the same fit with the boss for each of the drive collars. The dimensions B, C and D may vary for each of the drive collars. The following tabulation gives the dimensions, in inches, for the six drive collars utilized to fit the wheel roller bearings for the American cars constructed in the years 1963–1970:

|  | B | C | D |
|---|---|---|---|
| Collar 1 | 1.563 | 11° | 1.400 |
| Collar 2 | 1.777 | 11° | 1.562 |
| Collar 3 | 1.971 | 13° | 1.806 |
| Collar 4 | 1.964 | 10° | 1.750 |
| Collar 5 | 2.324 | 14° | 2.109 |
| Collar 6 | 2.557 | 14° | 2.355 |

In each collar the major diameter of the frustoconical aligning surface 76 is approximately 0.005 less than the major diameter of the tapered interior of the bearing race. The major diameter of the collar flange is 0.004 to 0.006 less than the outside diameter of the bearing race. Thus the two tapered surfaces of the collar and the bearing race may be aligned without jamming under the pressure of the drive collar when the handle is struck. Because the O.D. of the flange is slightly less than the O.D. of the bearing race, the bearing may be driven below the lip of the bearing recess.

The apparatus of the invention is inexpensive to fabricate, simple in operation and effective in results. The dimensions given for the collars are commensurate with today's needs buy may vary to accommodate future bearing requirements. Other variations within the scope of the invention may occur to those skilled in this art. It is therefore desired that the invention be measured by the appended claims rather than the illustrative disclosures set forth above.

I claim:

1. A driver for bearing races having exterior walls and tapered interior bores of varying taper and diameter, the driver comprising a driver handle, a handle boss; a plurality of drive collars each having an internal bore adapted to fit on the handle boss; each collar further having a tapered exterior wall and an abutting flange, at least one of the wall taper and wall diameter dimensions differing from collar to collar.

2. A driver in accordance with claim 1 further comprising an internal helical thread form extending into the handle from the handle boss.

3. A driver in accordance with claim 1 further comprising a threaded aperture opening from the boss and extending into the handle, and collar and race support means secured in the threaded aperture.

4. A driver in accordance with claim 1 wherein each collar comprises a frustoconical exterior wall, a cylindrical inner wall, and a cylindrical flange adjacent the exterior wall of greater diameter than said exterior wall.

5. A driver in accordance with claim 1 wherein the taper of the exterior wall of a collar matches the taper of the interior wall of a given bearing race.

6. A driver in accordance with claim 1 wherein the diameter of the collar flange of each collar is slightly less than the external diameter of a given bearing race.

7. A driver for a group of bearing races having exterior walls and tapered interior bores of varying taper and diameter, the driver comprising a driver handle, a handle boss and a threaded recess in the boss; a plurality of drive collars each having an internal bore adapted to fit on the handle boss; each collar further having a tapered exterior wall and an abutting flange, at least one of the wall taper and wall diameter dimensions differing from collar to collar.

8. A driver in accordance with claim 7 further comprising a threaded aperture opening from the boss and extending into the handle, and collar and race support means secured in the threaded aperture.

9. A driver in accordance with claim 7 wherein each collar comprises a frustoconical exterior wall, a cylindrical inner wall, and a cylindrical flange adjacent the exterior wall of greater diameter than said exterior wall, said inner wall being adapted to make a slip fit with the handle boss.

10. A driver in accordance with claim 7 wherein the taper of the exterior wall of a collar matches the taper of the interior wall of a given bearing race.

* * * * *